United States Patent
Yegin et al.

(10) Patent No.: US 7,242,566 B2
(45) Date of Patent: Jul. 10, 2007

(54) SURGE PROTECTION DEVICE

(75) Inventors: Sural Yegin, Chula Vista, CA (US); Pieter Loftus, San Diego, CA (US); Kenneth J. Brown, Chula Vista, CA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/129,955

(22) Filed: May 16, 2005

(65) Prior Publication Data

US 2006/0002049 A1 Jan. 5, 2006

Related U.S. Application Data

(60) Provisional application No. 60/574,243, filed on May 25, 2004.

(51) Int. Cl.
*H02H 2/22* (2006.01)
(52) U.S. Cl. .................................................. 361/111
(58) Field of Classification Search ................ 361/111, 361/124, 125
See application file for complete search history.

(56) References Cited

U.S. PATENT DOCUMENTS

| | | | |
|---|---|---|---|
| 6,118,639 A * | 9/2000 | Goldstein | 361/55 |
| 6,122,157 A * | 9/2000 | Gerlach | 361/124 |
| 6,614,636 B1 * | 9/2003 | Marsh | 361/91.1 |
| 6,646,839 B2 * | 11/2003 | Chaudhry et al. | 361/44 |
| 6,683,770 B1 * | 1/2004 | Marsh | 361/111 |
| 6,816,352 B2 | 11/2004 | Hoops | |

* cited by examiner

*Primary Examiner*—Stephen W. Jackson
*Assistant Examiner*—Boris Benenson
(74) *Attorney, Agent, or Firm*—Paul J. Sutton

(57) ABSTRACT

A surge suppression circuit with a thermal cutoff includes a first surge suppressor in series with a first thermal cutoff device between a phase conductor and a neutral conductor. A second surge suppressor in series with a second thermal cutoff device is between the phase conductor and a ground conductor. A third surge suppressor is in series with a low temperature thermal cutoff device between the neutral conductor and the ground conductor. The thermal cutoff temperature of the low temperature thermal cutoff device is lower than the thermal cutoff temperature of the first thermal cutoff device.

24 Claims, 2 Drawing Sheets

SURGE PROTECTION DEVICE

This application claims the benefit of the filing date of a provisional application having Ser. No. 60/574,243, which was filed on May. 25, 2004.

BACKGROUND

1. Field of the Invention

The disclosure relates to electrical surge protector devices.

2. Description of the Related Art

A semiconductor device can be degraded by excessive voltage. Destructive breakdown or damage can occur in semiconductor devices when subjected to transient over-voltages that persist for only a few microseconds. Transient Voltage Surge Suppression (TVSS) devices, referred to interchangeably herein as surge suppressors and voltage-clamping devices, are commonly known for use in suppressing such over-voltage transients to protect voltage-surge intolerant circuitry. TVSS devices include nonlinear, voltage-dependent resistive elements which display electrical behavior similar to that displayed by a pair of series-connected, back-to-back zener diodes. At normal voltages, below the TVSS clamping voltage level, TVSS devices display a high resistance with a small leakage current. When subjected to large transient voltages (above the TVSS device's clamping voltage), the TVSS device may operate in a low resistance region which increases current flow through the device. When the voltage is increased, the TVSS, due to its characteristics, presents a lower resistance path to current to divert most of the current away from circuitry connected to the TVSS. The potentially destructive surge energy can be dissipated or passed through the voltage-clamping (TVSS) device.

Avalanche diode suppressors, metal oxide varistors (MOVs) and selenium surge suppressors can be utilized as TVSS devices with varying advantages and disadvantages, such as an MOV-based TVSS's inherent susceptibility to failure under certain conditions. MOV devices tend to break down when exposed to an elevated voltage over a long period of time. The breakdown can result in some leakage current through the MOV. Also, MOV components can have a tendency to explode when overheated, often with sufficient explosive power to fracture plastic housings and sheet metal enclosures within which they reside. The explosion can destroy everything within the TVSS housing and may possibly shoot hot black powder through small openings in the housing. Various techniques have been developed to protect MOVs from the causative factors leading to such explosive conditions.

One technique for protecting metal oxide varistors (MOVs) requires adding a current fuse in series with the MOV, which trips to an open state to protect the MOV when particular transient over-voltages are detected. Transients with $I^2 t$ ratings that are greater than the fuse rating, but just below the MOV rating will blow the fuse, electrically removing the MOV from the over-voltage condition. Under circumstances where the fuse displays an $I^2 t$ rating such that commonly occurring transients are insufficient to blow the fuse, i.e., from a few to 10,000 amperes, but of insufficient magnitude to force the MOV to its low impedance state, the MOV may be subjected to overheating, possibly leading to thermal runaway. Steady state, abnormal over-voltage conditions below those at which the fuse will blow may also generate sufficiently high currents through the MOV leading to dangerous overheating.

A second common technique for protecting MOVs from overheating due to abnormal steady state or transient over-voltage conditions utilizes a thermal cutoff device (TCO) coupled in series with the MOV. A TCO is an electrical device that senses the temperature of a surface of an object such as an electrical circuit and trips to a high impedance state (open circuit) at a particular maximum rated temperature. When a TCO is connected in series with an MOV, the TCO senses the surface temperature of the MOV and trips to an open circuit at a particular maximum rated temperature, to cut off voltage to the MOV. Thermal cutoff devices, however, like current fuses are not without problems when used within MOV-protected circuits. In particular, it is extremely difficult, and sometimes impossible to achieve good thermal contact between a surface of the MOV and a thermal cutoff device. Consequently, the MOV may overheat to a point of thermal runaway before the critical temperature is detected and the over-voltage is cutoff from the MOV by the TCO. Further, mismatch problems also may occur between the time constant of the thermal cutoff (i.e., time to open) and the heating/time characteristics of the MOV even when good temperature detection is possible, to render accurate MOV protection unreliable. Both current fuses and thermal cut off devices permanently open upon occurrence of an event and, therefore, must be replaced after such event.

Transient Voltage Suppressors that include MOV-protected circuits may be subjected to over-voltage conditions to determine whether the MOV circuits can fail in a safe manner, that is, without causing damage to equipment or harm to people. In particular, a "Limited current abnormal over-voltage" test involves applying twice-rated normal operating voltage but limits the current to a value below the trip point of any over-current protection device in the power supply line. The test can result in the non-violent heating of the MOVs.

A surge suppression circuit can include three MOV-protected circuits one for each pair of power terminals: Phase and Neutral terminal pair, Phase and Ground terminal pair, and Neutral and Ground terminal pair. The surge circuit may be subjected to a "Limited current abnormal over-voltage" as part of a testing procedure. For example, an over-voltage test is applied across the Phase and Ground terminal pair (as well as the Neutral and Ground terminal pair). This test generates a leakage current that flows through the MOV because of the internal capacitance of the MOV. To prevent the leakage current from flowing to the Ground terminal, a TCO is electrically connected in series with, and physically adjacent, the MOV to detect the leakage current and open the circuit. When an over-voltage test is applied across the Phase and Neutral terminal pair, a leakage current flows from the MOV associated with the Phase and Neutral terminal pair. In this case, the leakage current also flows to the MOV connected across the Neutral to Ground terminal pair.

SUMMARY OF THE DISCLOSURE

There is disclosed a surge protection circuit having a thermal cutoff device to detect an over-voltage condition across a Phase and Neutral terminal pair of an AC power source to disconnect a MOV connected across the Neutral to Ground terminal pair when an over-voltage condition occurs. The circuit can prevent leakage current generated by an over-voltage condition from flowing through the MOV connected across the Neutral to Ground terminal pair of an AC power source.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest terms.

BRIEF DESCRIPTION OF THE DRAWINGS

Other aspects, features and advantages of the present invention will become more apparent from the following detailed description, the appended claims and the accompanying drawings in which similar elements are given similar reference numerals.

DETAILED DESCRIPTION

Figure 1:
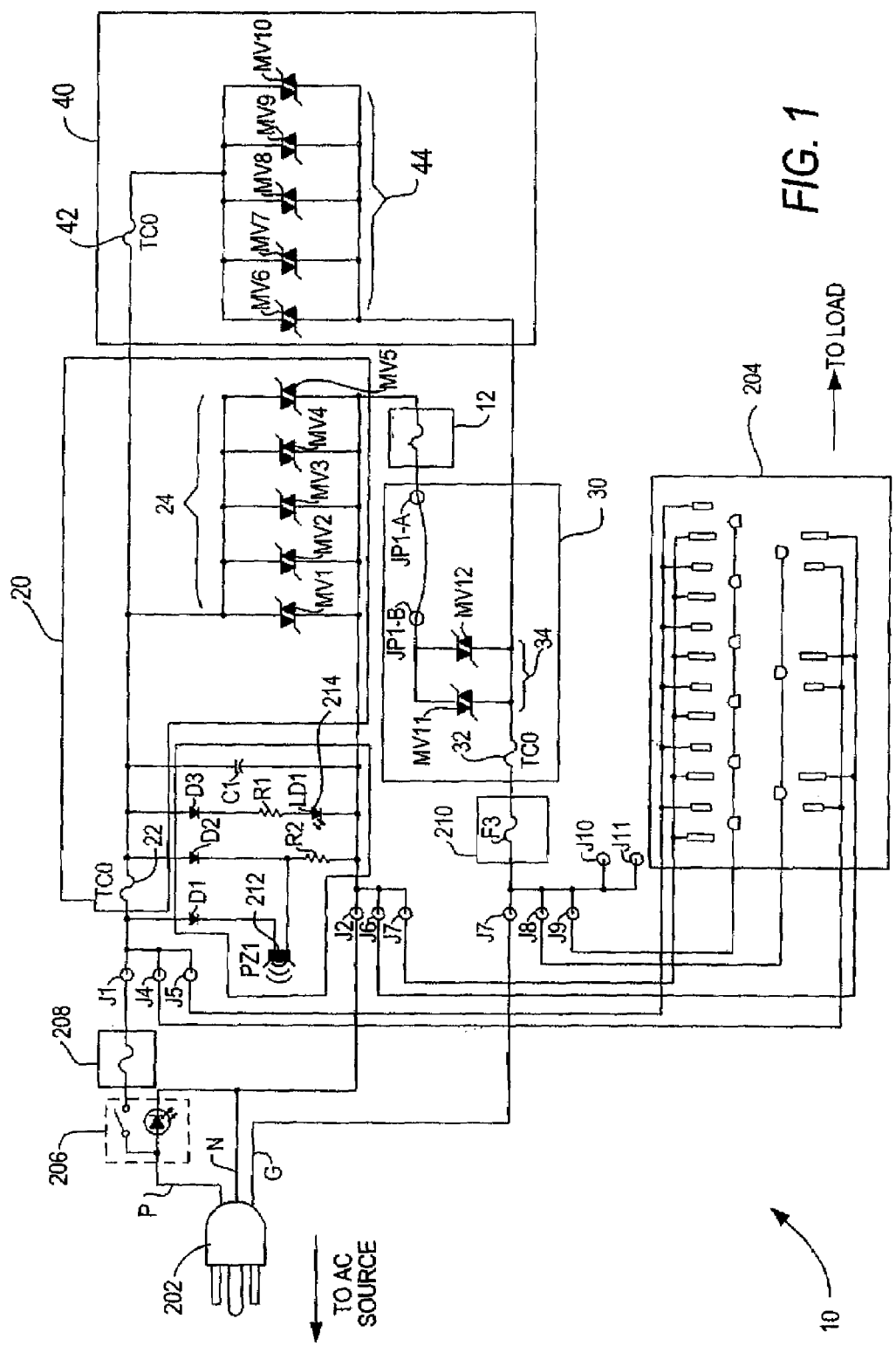
FIG. 1 is a schematic diagram of a surge suppression circuit for use in a power strip.

FIG. 1 is a block diagram of a surge suppression device circuit 10 with a thermal cutoff device (TCO) 12 having a low thermal cutoff that prevents leakage current from flowing from a first surge protection circuit 20 to a second surge protection circuit 30. The suppression circuit 10 connects an AC power source provided through a plug 202 having a standard Phase, Neutral and Ground terminals to power strip 204. The power strip 204 includes receptacle outlets to provide the AC power to a plug of an electrical load. In the implementation illustrated, the power strip includes nine receptacle outlets. The surge protection circuit 20 is connected across the Phase and Neutral terminal pair (a first electrical path) and can include a first TCO 22 connected in series with a first surge suppressor 24 to provide over-voltage protection for the first electrical path. TCO 22 is thermally coupled to surge suppressor 24 to detect when the temperature of surge suppressor 24 exceeds the thermal cutoff temperature of TCO 22. TCO 12 is electrically connected in series with surge protection circuit 30 and is in physical proximity (thermally coupled) to surge suppressor 24. TCO 12 has a thermal cutoff temperature that is lower than the thermal cutoff temperature of TCO 22. This arrangement permits TCO 12 to detect when the temperature of surge suppressor 24 exceeds the thermal cutoff temperature of TCO 12 that results from of an over-voltage condition applied across the Phase and Neutral terminal pair. TCO 12 opens causing over-voltage circuit 30 to be disconnected thereby protecting the surge suppressor circuit from damage.

Similarly, the second surge protection circuit 30 is electrically connected across the Neutral and Ground terminal pair (a second electrical path). Circuit 30 can include a second TCO 32 connected in series with a second surge suppressor 34 that provides over-voltage protection for the second electrical path. TCO 3 is in physical proximity (thermally coupled) to surge suppressor 34 to detect when the temperature of surge suppressor 34 exceeds the thermal cutoff temperature of TCO 32 caused by an over-voltage condition across the Neutral and Ground terminal pair. When this condition is detected, TCO 32 disconnects surge suppressor 34 from the second electrical path to protect the suppressor from damage.

A third surge protection circuit 40 can be electrically connected across the Phase and Ground terminal pair (a third electrical path) and can include a third surge suppressor 44 connected in series with a third TCO 42. The Phase terminal is coupled through the first TCO 22 to the third surge protection circuit 40. Surge suppressor 44 provides over-voltage protection for the third electrical path. TCO 42 is in physical proximity (thermally coupled) to surge suppressor 44 so that TCO 42 is able to detect when the temperature of surge suppressor 44 exceeds the thermal cutoff temperature of TCO 42 as a result of an over-voltage condition across the Phase and Ground terminal pair. When TCO 42 detects the over temperature condition, TCO 42 stops conducting thereby disconnecting surge suppressor 44 to prevent damage to the suppressor. In one embodiment, surge suppressors 24, 34 and 44 can be metal oxide varistors (MOV). In another embodiment, the thermal cutoff temperature of TCOs 22, 32 and 42 is approximately 102° C. and the thermal cutoff temperature of TCO 12 is approximately 77° C.

The surge suppressor circuit 10 also can include electrical components on a printed circuit board (not shown) that can provide indicia of a status of the surge suppressor circuit. For example, an audible device 212 can be caused to sound when one of the TCOs opens. Also, an indicator 214, such as a light emitting diode (LED) can be caused to illuminate when the Phase terminal is providing power to the surge suppressor circuit through TCO 22. The surge suppressor circuit can include an ON/OFF switch 206 to selectably provide AC line phase to the surge suppressor devices and power strip 204. A circuit breaker 208, such as a fuse, that opens when current through the circuit breaker exceeds a predetermined amount, can be connected in series with the Phase line to protect the surge suppressor circuit from excessive current drawn by an electrical load plugged into the power strip 204. An additional fuse 210 can be connected in series with the Neutral-Ground surge protection circuit 30 to provide over-current protection to the surge protection circuit over the Ground terminal.

In normal operation (i.e., not a temporary or transient over-voltage condition), surge suppression circuit 10 receives through plug 202 power from an AC voltage (e.g., 120 Volts for a residential setting) across the Phase and Neutral terminals and provides this voltage to the power strip 204. In the first over-voltage circuit 20, suppressor 24 operates in its high impedance state (open state) and thus does not generate substantially any heat. Because substantially no heat is generated, corresponding TCO 22 does not trip and is in a conducting state. Similarly, the components of the second and third over-voltage circuits 30, 40 are in an open state and the low thermal cutoff TCO 12 is in a conducting state.

During an abnormal over-voltage operating condition, one or more of the surge protection circuits 20, 30, 40 and TCO 12 are triggered to open to protect surge suppressors in the over-voltage circuits from damage as a result of the harmful condition. When the over-voltage test is applied across the Phase and Neutral terminal pair, surge suppressor 24 detects this condition and conducts thereby entering its low impedance state. This conduction state increases the temperature of surge suppressor 24 that can be detected by TCO 22. When the temperature of surge suppressor 24 exceeds the thermal cutoff temperature of TCO 22, the TCO opens causing the TCO to electrically disconnect suppressor 24 and prevent damage to the suppressor from the over-voltage condition.

Moreover, low thermal cutoff TCO 12 also can detect temperature changes of TCO 22 because TCO 12 is thermally coupled to surge suppressor 24. The thermal cutoff temperature of TCO 12 may be lower than the thermal cutoff temperature of TCO 22. For example, in one implementation, the thermal cutoff temperature of TCO 12 is 77° C. whereas the thermal cutoff temperature of TCO 22 is 102° C. If the temperature of surge suppressor 24 exceeds the thermal cutoff temperature of TCO 12, TCO 12 opens before TCO 22 opens. As a result, TCO 12 electrically disconnects suppressor 34 thereby preventing the suppressor from damage from the leakage current generated by suppressor 24.

Thus, TCO 12 is able to detect when an over-voltage condition occurs across the Phase and Neutral terminal pair and then disconnect surge suppressor 34 that is connected across the Neutral to Ground terminal pair. As a consequence of the disconnect, TCO 12 prevents leakage current generated by the over-voltage condition from flowing through the surge suppressor 34 that is connected across the Neutral to Ground terminal pair. Although TCO 12 disconnects surge suppressor 34, it does not disconnect the electrical path between the plug 202 and power strip 204. That is, TCO 12 prevents the leakage current from damaging surge suppressor 34 without disrupting power distribution to the load.

When the over-voltage condition appears across the Neutral and Ground terminal pair, surge suppressor 34 conducts. This conduction increases the temperature of surge suppressor 34 that is detected by TCO 32. When the temperature of surge suppressor 34 exceeds the thermal cutoff temperature of TCO 32 the TCO 32 opens causing the TCO to electrically disconnect surge suppressor 34 and prevent damage to the suppressor from the over-voltage condition.

Similarly, when the over-voltage condition appears across the Phase and Ground terminal pair, surge suppressor 44 conducts. This conduction increases the temperature of suppressor 44 which is detected by TCO 42. When the temperature of suppressor 44 exceeds the thermal cutoff temperature of TCO 42, the TCO 42 opens causing the TCO to electrically disconnect suppressor 44 and prevent damage to the suppressor from the over-voltage condition.

The over-voltage circuits 20, 30 and 40 each can include multiple MOVs for surge suppressors. For example, the first over-voltage circuit 20 can include five MOVs (e.g., MV1–MV5), the second over-voltage circuit 30 can include two MOVs (e.g., MV11–MV12) and the third over-voltage circuit 40 can include five MOVs (e.g., MV6–MV10). TCO 12 can be placed in series with the Neutral conductor feeding the electronics on the PCB 54 (FIG. 1). TCO 12 also is in series with one of the MOVs. TCO 12 is placed physically next to the MOV so it will open during an over-voltage event due to the heating of the MOV. The TCO 12 that is used has a lower operating temperature than other TCOs in the circuit. While the Neutral leading to the PCB is opened by TCO 12, the Neutral conductor from the AC power source to the surge suppressor is not opened.

Surge protection circuits 20, 30, 40 also can be mounted on the printed circuit board (PCB) (not shown). The plug 202 and the receptacle section 204 can be electrically connected to the PCB by jumpers J1–11.

Figure 2:
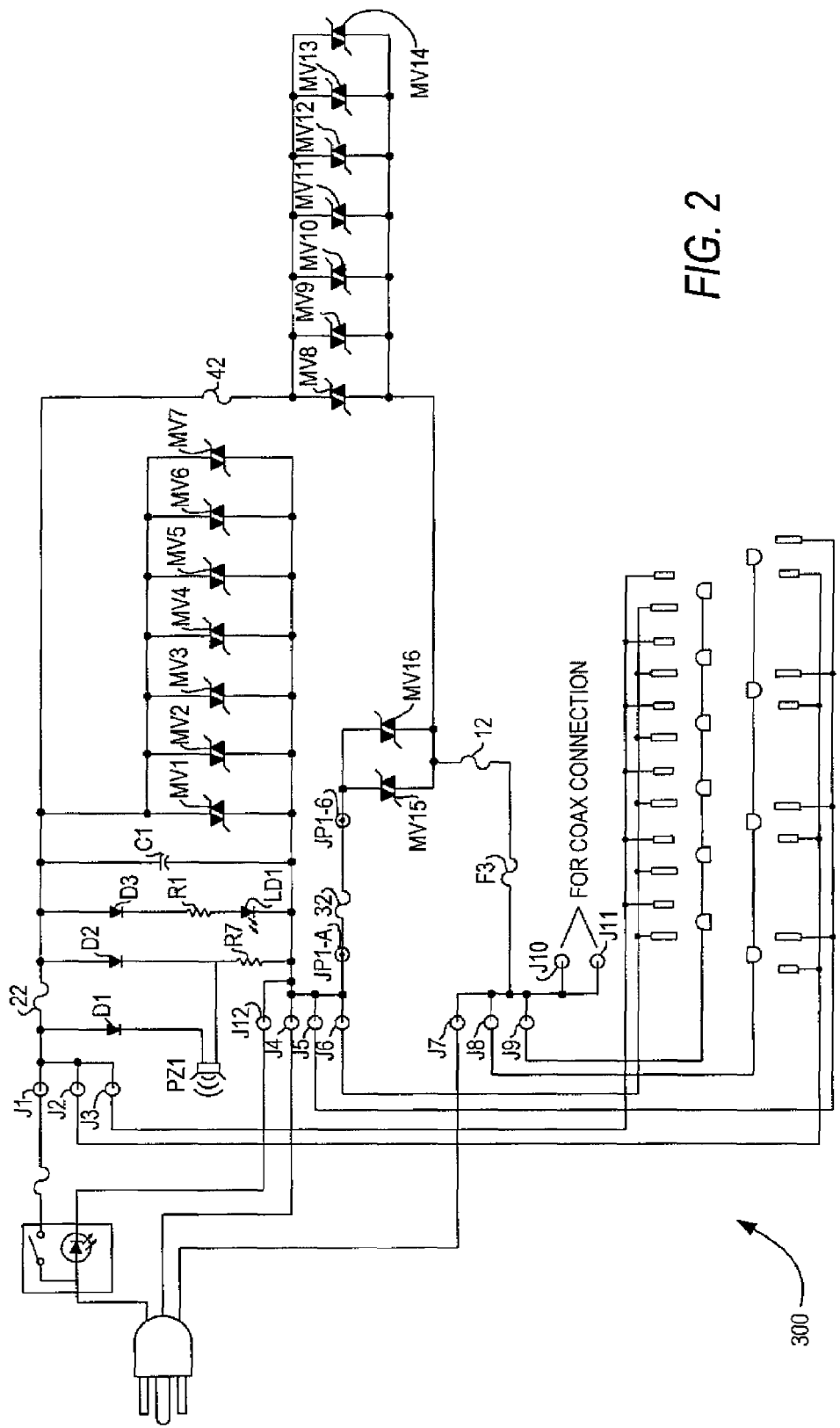
FIG. 2 is another schematic diagram of a surge suppression circuit for use in a power strip.

FIG. 2 is a schematic diagram of a surge suppression circuit for use in a power strip 300 according to another embodiment of the disclosure. Strip 300 is similar to strip 200 of FIG. 1 except that strip 300 has a receptacle section with ten receptacles instead of nine as shown in FIG. 1.

While there have been shown and described and pointed out the fundamental novel features of the disclosure as applied to the various embodiments, as is presently contemplated for carrying them out, it will be understood that various omissions and substitutions and changes of the form and details of the device illustrated and in its operation may be made by those skilled in the art, without departing from the spirit of the disclosure.

What is claimed is:

1. A method of surge protection for an electrical power cord, comprising
    coupling a phase conductor and a neutral conductor of the electrical power cord with a first surge protection device;
    coupling the neutral conductor and a ground conductor of the electrical power cord with a
    second surge protection device; and
    disposing a low temperature thermal cutoff device in series with the second surge protection device,
    wherein the cutoff temperature of the low temperature thermal cutoff device is lower than the thermal cutoff temperature of a first thermal cutoff device.

2. The method of claim 1, further comprising coupling the neutral conductor and the ground conductor with a third surge protection device.

3. The method of claim 2, wherein the first surge protection device includes a first surge suppressor, the second surge protection device includes a second surge suppressor and third surge protection circuit includes a third surge suppressor.

4. The method of claim 2, wherein the first, second and third surge suppressors comprise metal oxide varistors.

5. The method of claim 1, wherein the thermal cutoff temperature of the low temperature thermal cutoff device is less than about 77 degrees centigrade.

6. The method of claim 1, wherein the thermal cutoff temperature of the first thermal cutoff device is less than about 102 degrees centigrade.

7. A surge suppression circuit with a thermal cutoff comprising:
    a phase, a neutral and a ground terminal for providing an electrical path between a power source and a load;
    a first surge protection circuit electrically connected across the phase and neutral terminals to provide a first electrical path, the first surge protection circuit comprising a first surge suppressor connected in series with a first thermal cutoff device;
    a second surge protection circuit electrically connected across the neutral and ground terminals to provide a second electrical path, the second surge protection circuit comprising a second surge suppressor connected in series with a second thermal cutoff; and
    a low thermal cutoff thermal cutoff electrically connected in series with the second surge protection circuit,
    wherein the low thermal cutoff thermal cutoff has a thermal cutoff temperature that is lower than a thermal cutoff temperature of the first thermal cutoff, the low thermal cutoff thermal cutoff detects when the temperature of the first surge suppressor exceeds the thermal cutoff of the low thermal cutoff thermal cutoff caused by leakage current flowing through the first electrical path as a result of an over-voltage condition across the phase and neutral terminals, and the low thermal cutoff thermal cutoff opens the second electrical path preventing the leakage current from flowing through the second electrical path while still providing the electrical path between the power source and load.

8. The surge suppression circuit of claim 7, wherein the first thermal cutoff is thermally coupled to the first surge suppressor to detect when the temperature of the first surge suppressor exceeds a first thermal cutoff of the first thermal cutoff.

9. The surge suppression circuit of claim 7, wherein the low thermal cutoff thermal cutoff is thermally coupled to the first surge suppressor so as to be able to detect when the temperature of the first surge suppressor exceeds the thermal cutoff of the low thermal cutoff thermal cutoff.

10. The surge suppression circuit of claim 7, wherein the first surge suppressor is a metal oxide varistor.

11. The surge suppression circuit of claim 7, wherein the second surge suppressor is a metal oxide varistor.

12. The surge suppression circuit of claim 7, further comprising:
a third surge protection circuit electrically connected across the phase and ground terminals so as to provide a third electrical path, the third surge protection circuit comprising a third surge suppressor connected in series with a third thermal cutoff having a third thermal cutoff, wherein the third thermal cutoff detects when the temperature of the third surge suppressor exceeds the third thermal cutoff caused by leakage current flowing through the third electrical path as a result of an over voltage condition across the third path.

13. The surge suppression circuit of claim 12, wherein the third surge suppressor is a metal oxide varistor.

14. The surge suppression circuit of claim 7, further comprising a circuit breaker electrically connected in series with the phase terminal to provide over-current protection to the phase terminal.

15. The surge suppression circuit of claim 7, further comprising a fine electrically connected in series with the ground terminal to provide over-current protection to the ground terminal.

16. The surge suppression circuit of claim 7, further comprising a status indicator to provide an indication of the status of the surge suppression circuit.

17. The surge suppression circuit of claim 16, wherein the status indicator is a buzzer to provide an audio indication of the status of the surge suppression circuit.

18. The surge suppression circuit of claim 16, wherein the status indicator is a light emitting diode to provide a visual indication of the status of the surge suppression circuit.

19. The surge suppression circuit of claim 7, further comprising an electrical plug having a phase, a neutral and a ground prong for connecting to the power source.

20. The surge suppression circuit of claim 7, further comprising one or more receptacles each having a phase, a neutral and a ground terminal for connecting to a load.

21. A surge suppression circuit with a thermal cutoff comprising:
a first surge protector coupled between a phase conductor and a neutral conductor;
a second surge protector coupled between the phase conductor and a ground conductor; and
a third surge protector in series with a low temperature thermal cutoff device, wherein said series combination of the third surge protector and the low temperature thermal cutoff device is coupled between the neutral conductor and the ground conductor and wherein the first surge protector comprises a first surge suppressor in series with a first thermal cutoff device;
the second surge protector comprises a second surge suppressor in series with a second thermal cutoff device; and
the third surge protector comprises a surge suppressor and a third thermal cutoff device,
wherein the cutoff temperature of the low temperature thermal cutoff device is lower than the thermal cutoff temperature of the first thermal cutoff device.

22. The surge suppressor circuit of claim 21, wherein the surge suppressors comprise metal oxide varistors.

23. The surge suppressor circuit of claim 21, wherein the thermal cutoff devices comprise thermal fuses.

24. The surge suppressor circuit of claim 21, wherein the thermal cutoff temperature of the low temperature thermal cutoff device is about 77 degrees centigrade.

* * * * *

UNITED STATES PATENT AND TRADEMARK OFFICE
CERTIFICATE OF CORRECTION

PATENT NO. : 7,242,566 B2
APPLICATION NO. : 11/129955
DATED : July 10, 2007
INVENTOR(S) : Sural Yegin, Pieter Loftus and Kenneth J. Brown It is certified that error appears in the above-identified patent and that said Letters Patent is hereby corrected as shown below:

Column 6, line 22 (Claim 2):

"neutral conductor and" should be --phase conductor and--;

Signed and Sealed this

Twenty-second Day of September, 2009

David J. Kappos
*Director of the United States Patent and Trademark Office*